July 3, 1962  LE ROI E. HUTCHINGS  3,042,147
LUBRICATING SYSTEM
Filed Nov. 25, 1959

INVENTOR.
LE ROI E. HUTCHINGS
BY Edward H. Lang
ATTORNEY

3,042,147
LUBRICATING SYSTEM
Le Roi E. Hutchings, Crystal Lake, Ill., assignor to The Pure Oil Company, Chicago, Ill., a corporation of Ohio
Filed Nov. 25, 1959, Ser. No. 855,462
4 Claims. (Cl. 184—6)

This invention relates to lubrication systems, and particularly to such systems intended for use with engines which are subject to wide variations of temperature.

It is well known that the usual lubricating oils thicken when cooled, and therefore do not provide proper lubrication over a wide range of temperatures. The introduction of a less viscous lubricant during the periods of starting, when the engine is cold, has been suggested. No satisfactory arrangement has been presented for introducing a lubricant of reduced viscosity to the engine during starting or other cold running periods which substantially prevents mixing of the high-temperature and low-temperature lubricants. The prior art does teach the use of lubricating systems by which a diluent, such as gasoline, is added to the oil during the warm-up period. Such methods have not proved to be altogether satisfactory, first of all because the lubricating oil diluted with a thinner such as gasoline provides a highly inferior lubricant, and secondly because the diluted oil is returned eventually to the main oil storage reservoir where it mixes with the main body of lubricating oil and exerts a deleterious effect upon the lubricating properties of the oil as a whole.

It is an object of this invention to provide a dual lubricant system for use with engines intended to operate over extreme temperature ranges to provide adequate lubrication of the engine at both high and low temperatures, and avoid or substantially reduce contamination of the lubricants. It is the further object of this invention to provide an automatic lubricating system utilizing two separate bodies of lubricant of differing viscosities, including means for automatically providing for flow to the engine of lubricant from the lubricant body having the desired viscosity.

In accordance with this invention, a system has been devised whereby two or more conventional lubricating oils, the combined properties of which satisfy the entire range of operating temperatures, are used independently with automatic selection of the lubricant which provides the most suitable lubrication under the conditions at the time of use. Basically, the system comprises supplies of each of the lubricants contained in separate reservoirs, with automatic valving means for switching from one reservoir to the other in response to variations in temperature or other operating conditions detected by continuous sensing means. In this way, a relatively viscous and thermally stable oil can be provided in periods of high-temperature operation, and a relatively nonviscous oil can be provided during periods of low-temperature operation, with automatic switching from one to the other as operation conditions vary. The invention will be illustrated by the use of temperature as the controlling variable, but flow pressure, which is dependent upon the viscosity of the oil, or other variables may be used alternatively as criteria for automatically switching from one lubricant to another. While the engine to be lubricated will ordinarily be a heat engine, and more specifically an internal combustion engine, the method of this invention is applicable to various classes of machinery which must operate over widely fluctuating temperature ranges. Thus the word "engine" as used in this specification and the appended claims should be taken to include machinery which requires lubrication and which operates under variable temperature conditions.

This invention is best described with reference to the drawings, of which:

Figure 1:
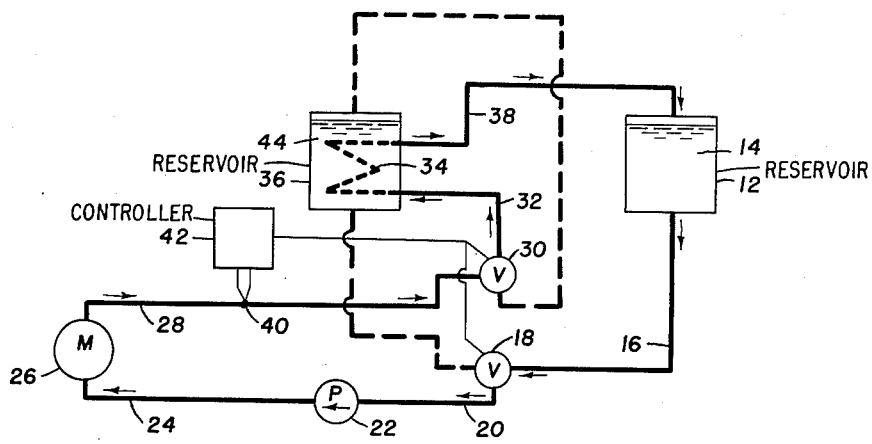
FIGURE 1 is a schematic diagram of the apparatus of this invention, showing in solid line the flowpath of the low-temperature lubricating circuit, and in dotted line the flowpath of the high-temperature lubricating circuit.

Referring to FIGURE 1, reservoir 12 contains low-viscosity oil 14 which flows through line 16, valve 18, line 20, pump 22 and line 24, to engine 26. The oil then returns from engine 26 to line 28, valve 30, line 32, heat-exchange coil 34 in reservoir 36, and line 38 to reservoir 12. The temperature of the oil returning through line 28 is detected by thermocouple 40, and the signal from thermocouple 40 is transmitted to controller 42 which, when the temperature exceeds a certain preselected value, such as 175° F., where the viscosity of the oil in the aforedescribed, low-temperature circuit becomes inadequate, automatically repositions valves 18 and 30 to terminate the flow of low-viscosity oil from reservoir 12 and admits high-viscosity oil 44 from reservoir 36 to engine 26, as is set out in FIGURE 2.

Figure 2:
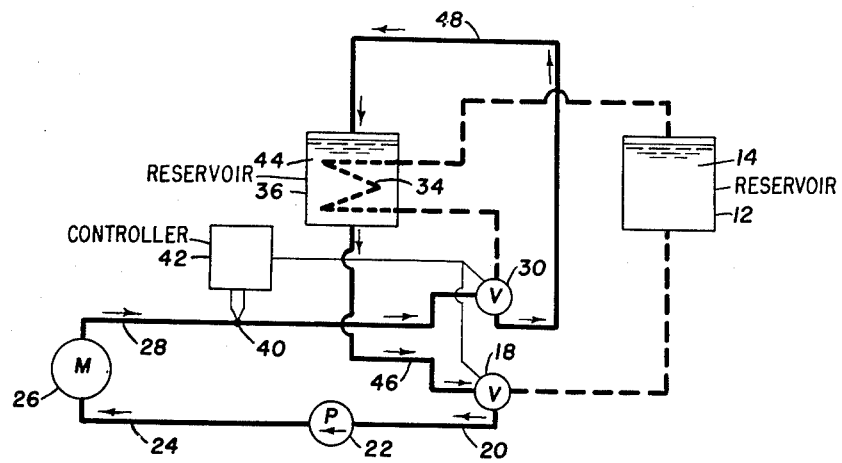
FIGURE 2 is a schematic diagram of the apparatus depicted in FIGURE 1 showing in solid line the flowpath of the high-temperature lubricating system.

Referring to FIGURE 2, during periods of high-temperature operation, high-viscosity oil 44 from reservoir 36 flows through line 46, valve 18, line 20, pump 22, and line 24 to engine 26. It returns from engine 26 through line 28, valve 30, and line 48 to reservoir 36. The high-viscosity oil 44 in reservoir 36 is preheated to some extent, and thereby made less viscous and more readily pumpable, by heat exchange with the hot low-viscosity oil flowing through coil 34 during periods of low-temperature operation. Since the engine is ordinarily cold upon starting, the operation is initially with the use of the low-temperature oil. The heat exchange provided by coil 34 brings the high-viscosity running oil up to temperature before valves 18 and 30 are actuated to disconnect the high-viscosity lubricant circiut and connect the low-viscosity lubricant system to pump 22 and engine 26. Thus the undesirable effects of introducing a cold high-viscosity lubricant into the engine is avoided.

If the temperature of the high-viscosity oil returning through line 28, sensed by thermocouple 40, drops below about 150–200° F., controller 42 automatically repositions values 18 and 30 to terminate the flow of high-viscosity oil and admit low-viscosity oil to the engine. Optionally, manual means may be provided for repositioning valves 18 and 30 to admit low-viscosity lubricant to the engine just before the engine is shut off when restarting at low temperatures is anticipated.

It is apparent that some mixing of the low-viscosity and high-viscosity oils will occur with every automatic switch from one to the other. The extent of this mixing can be minimized by maintaining the volumetric capacity of lines 20, 24 and 28, and pump 22 as low as possible without unduly restricting oil flow. Consequently, it is preferred to make these lines of small-diameter tubing, place the valves 18 and 30 as close to engine 26 as is practical, and operate pump 22 at a relatively high discharge pressure to overcome the pressure drop through the small-diameter tubing, and achieve adequate flow rates. The extent of mixing is dependent upon the volumes of only the pump and the lines listed above, taken together with the engine, through which both oils flow, and is not affected by the volumes of other lines or elements of the two circuits.

Figure 3:
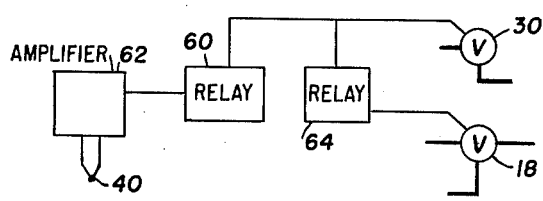
FIGURE 3 shows an alternate embodiment wherein separate relays are used to actuate certain control valves.

Controller 42 may be any one of several known devices for converting a sensed temperature into mechanical motion. A preferred controller device will be described for purposes of illustration. The electrical impulse from thermocouple 40 may be amplified by suitable means, such as a vacuum tube, and the signal from the vacuum tube fed to the coil of a relay. When the temperature of the lubricant reaches a predetermined value, the relay closes and thus energizes a solenoid which operates one or both of valves 18 and 30. In the embodiment of this invention previously described, valves 18 and 30 were intended to be actuated simultaneously to switch from the low-temperature circuit to the high-temperature circuit, or back again. It is preferred, however, to use separate solenoids to control valves 18 and 30, and to energize the solenoid actuating valve 18 by means of a relay such as relay 60 of FIGURE 3, which operates in response to the amplified signal sensed by the thermocouple 40 and amplified by amplifier 62. A second relay 64, which is preferably a standard time-delay relay, is actuated by the closing of the first-described relay. The time-delay relay in turn energizes the solenoid controlling valve 30. Thus the two valves will not be actuated simultaneously, there being a slight delay between the repositioning of valve 18 and the subsequent repositioning of valve 30. This modification serves to substantially reduce the extent of mixing between the high-viscosity and low-viscosity lubricating oils. The time delay should be sufficient to permit the lubricating fluid in line 20, pump 22, line 24, engine 26 and line 28 to flow through its normal course to valve 30, before valve 30 is actuated. Thus the lubricant in line 20, pump 22, line 24, engine 26 and line 40 will be returned to the proper reservoir. Some mixing of lubricant in the engine cannot be avoided, but the use of a suitable time-delay period can substantially reduce the extent of lubricant mixing.

The embodiments of the invention in which an exclusive property or privileged is claimed are defined as follows:

1. A lubrication system comprising an engine having a lubricant inlet and outlet, a valve connected to the lubricant inlet of said engine, a second valve connected to the outlet of said engine, said valves acting to connect the engine to one of two lubricant circuits hereafter defined, means responsive to a variable related to the viscosity of the lubricant leaving the engine for actuating said valves to connect the engine in the first of said circuits when the variable is above a predetermined level, and in the second of said circuits when the variable is below said level, a first lubricant circuit including a first lubricant reservoir, and a second lubricant circuit including heat-exchange means and a second lubricant reservoir serially connected therewith, said heat-exchange means being adapted to transfer heat from lubricant flowing in said second lubricant circuit to lubricant in said first reservoir.

2. An apparatus according to claim 1 in which said heat-exchange means comprises a coil of tubing supported within said first-mentioned reservoir.

3. An apparatus according to claim 1 in which said variable is temperature and the means for actuating said valves provides a time-delay between the actuation of said inlet-connected valve and the actuation of said outlet-connected valve sufficient to permit a major portion of the lubricant in the engine at the instances of actuation of said inlet valve to flow past said outlet valve before the actuation thereof.

4. An apparatus according to claim 3 in which said valves are solenoid-actuated and said temperature-responsive means comprises a thermocouple, relay means responsive to the output of said thermocouple for energizing the solenoid-actuated, inlet-connected valve electrically connected to said thermocouple and said solenoid-actuated, inlet-connected valve, and a time-delay relay responsive to the operation of said relay for energizing the solenoid-actuated, outlet-connected valve at a predetermined interval after the actuation of said inlet valve electrically connected to said relay and said solenoid-actuated, outlet-connected valve.

References Cited in the file of this patent

UNITED STATES PATENTS

| 2,374,639 | Miller | Apr. 24, 1945 |
| 2,388,523 | Briechel | Nov. 6, 1945 |

FOREIGN PATENTS

| 896,336 | France | Feb. 19, 1945 |